A. Booth,
Making Shot.

Nº 20,250.   Patented May 18, 1858.

UNITED STATES PATENT OFFICE.

A. BOOTH, OF NEW YORK, N. Y.

IMPROVEMENT IN MAKING SHOT.

Specification forming part of Letters Patent No. 20,250, dated May 18, 1858.

*To all whom it may concern:*

Be it known that I, ALFRED BOOTH, of the city, county, and State of New York, have invented a new and useful Improvement in Shot-Making; and I do hereby declare that the following is a full and exact description thereof.

To enable others to make and use my invention, I proceed to describe my mode and apparatus, reference being had to the drawings hereunto annexed, and making part of this specification.

Figure 1:
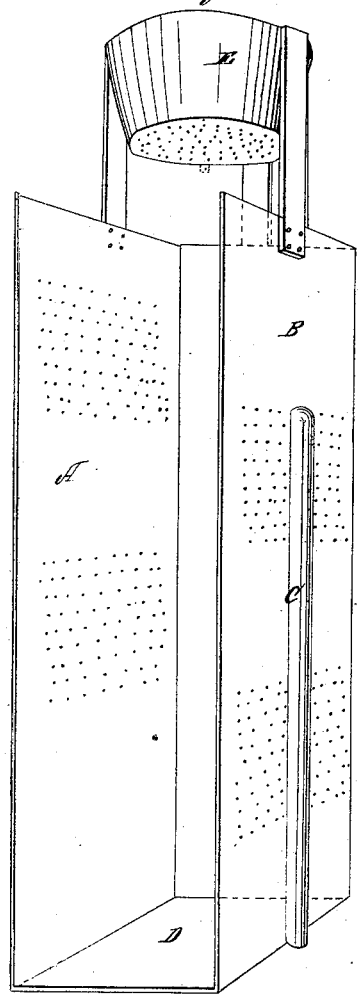
Figure 2:
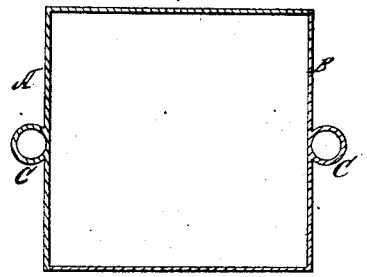

Figure 1 is a elevation of a tall box, (the front side removed,) to represent the inclosed space in which the shot are dropped; Fig. 2, a plan of the box and of the water-conduits at the sides.

The nature of this invention consists in artificially cooling the shot as they fall, so as to obviate the use of a shot-tower. To accomplish this purpose I make a tall box—say one or two feet square upon the base and about thirty feet high—at the top of which I set the sieve which is to receive the melted lead. At each side of the box there are perforations, made in groups—that is, at the top, on one side, as at A, there is a group of exceedingly fine perforations. On the opposite side, B, of the box, at a lower position, there are similar perforations. Then on the side A, leaving a blank space, there is another group of perforations, and so on, the perforations of one side, A, being opposite to the blank spaces in the side B. These groups of perforations are to admit water, which is conveyed to them by the pipe C, the sides being partially inclosed to contain the water. (The inclosure not represented in the drawings.) The perforations being exceedingly fine and in great number, and the pressure of water through them being considerable, when the water is turned on it is forced into the interior of the box in the form of spray. On one side, at top, there is a shower of fine spray, scarcely more than mist. On the opposite side, a little lower down, is another group, and so on, as represented in the drawings. The groups of perforations at top are the finest possible. Those lower down are a little larger, and they increase in size until they become almost a mass of water. The effect is this: As the lead for the shot drops, it comes in contact with the fine spray of cold water, the conducting property of which cools instantly a film upon the outside of the spherical metal. As it falls, it is rapidly cooled by increasing quantity of water, until it is hard enough to be safely cooled in the water which is at the bottom of the box. By this means large shot can be made in an ordinary building without the necessity of erecting shot-towers. The fine spray of water cools the lead rapidly, and yet does not disturb the sphericity of the shot. Attempts have been made to effect the same purpose by means of a current of cold air, and some assistance is indeed rendered to the cooling process; but air is a non-conductor of caloric, while water readily absorbs it, and therefore this plan of letting the lead fall through a fine dense spray of water to cool the shot is an improvement upon other modes.

What I claim as my invention, and desire to secure by Letters Patent, is—

The filling a chamber with spray and dropping melted lead through it to facilitate the cooling of the shot, constructed and arranged substantially as above described.

ALFRED BOOTH.

Witnesses:
OWEN G. WARREN,
JOHN D. STURTEVANT.